June 28, 1938.   R. CHILTON   2,121,950
BALL SUSPENDED DYNAMIC COUNTERWEIGHT
Filed Jan. 23, 1937
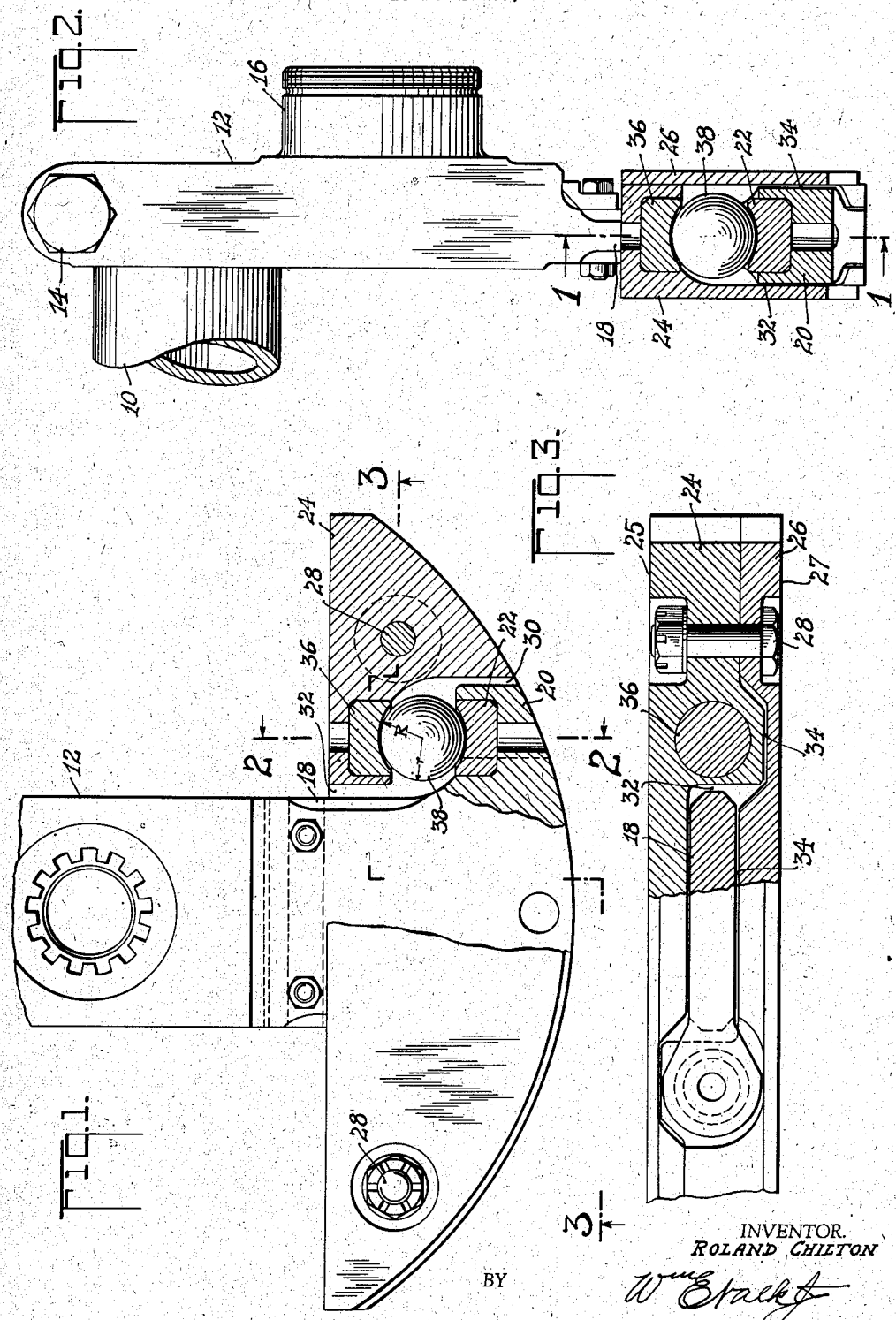
INVENTOR.
ROLAND CHILTON
BY
ATTORNEY.

Patented June 28, 1938

2,121,950

UNITED STATES PATENT OFFICE 2,121,950

BALL SUSPENDED DYNAMIC COUNTER-
WEIGHT

Roland Chilton, Ridgewood, N. J., assignor to
The Reed Propeller Co., Inc., a corporation of
New York Application January 23, 1937, Serial No. 121,975

11 Claims. (Cl. 74—604)

This invention comprises improvements in dynamic counterweights for the elimination of torsional vibrations of the general type disclosed in my co-pending application, Serial No. 7,475, filed February 21, 1935. That application shows a counterweight member pendulously mounted on a crankshaft member by rollers rollably engaging holes in each member, the radius of pendulum swing being defined by the difference in diameter between the rollers and the holes. This form of twin-roller suspension endows the counterweight mass with the properties of a simple pendulum since every point on the mass swings thru the same radius of arc.

When such a pendulum is associated with rotating shaft, the restoring force is furnished by centrifugal force wherefore the pendulum period increases with the speed of rotation so that the pendulum makes the same number of swings per revolution regardless of the speed of revolution. It is known that when the pendulum frequency is made equal to the frequency of the torque impulses to which the shaft is subject, then the pendulum mass will automatically swing 180° out of phase with the exciting impulses which are thus neutralized.

This type of dynamic counterweight has gone into extensive and successful use in radial aircraft engines and has been found effective in eliminating crankshaft accelerations and vibrations in the rotational sense.

However, in certain cases, it has been found that crankshafts may be subject to "tuning-fork" or fore and aft vibrations of the counterweights, due to the elasticity of the crankarms and crankpins. Should the natural frequency of vibration of the counterweight mass in this axial sense become synchronous with the bending deflections to which the shaft is subject in operation, fatigue failure of the counterweight attachments is apt to occur. In the case of roller type dynamic dampers, the slight relative axial movement between the counterweight and the crankshaft member from some such vibration has, in certain cases, produced scuffing or wear of the cylindrical rollers which are subject to sliding against their races should any relative axial displacements occur.

Accordingly, a prime object of the present invention is to provide a means whereby the dynamic counterweight can act not only in the rotational, but also in the axial direction, to damp out "tuning-fork" as well as torsional vibrations. An associated object is to develop a pendulum counterweight support which can take up any axial vibration between the crankshaft and the counterweight by rolling as distinct from sliding action.

Other objects will be obvious from, or will be pointed out, in the following description, with reference to the drawing in which similar numbers indicate similar parts and in which;

Fig. 1 is an end view in part section on the line 1—1 of Fig. 2,

Fig. 2 is a fragmentary side view and in part, a section on the line 2—2 of Fig. 1, and Fig. 3 is a fragmentary plan view and in part, a section on the line 3—3 of Fig. 1.

In the drawing 10 designates one end of a conventional crankpin to which a crankcheek 12 is secured by a conventional clamp bolt 14, the cheek being provided with the usual journal 16. The cheek is provided with an extension arm 18 furnished with two lateral extensions or bosses 20 into which are fitted spherical cups or sockets 22.

A counterweight comprising two similar halves 24—26 secured together by bolts 28 is disposed loosely around the extension 18, freedom for circumferential movement of the counterweight being provided by clearances indicated at 30—32 Fig. 1 and clearance for slight axial movement being provided as indicated at 34 Figs. 2 and 3. The counterweight halves 24—26, though similar to each other, are each formed with one thick end 25 and one thin end 27, the thick end 25 of each half having a socket within which is fitted a hardened cup 36 having a spherically concave surface. With the halves assembled, the cups 36 are opposed to the cups 22, lying radially inward thereof. Between each set, consisting of a cup 22 and a cup 36 is placed a ball 38.

It will be seen that the radius "R" of the cups is made greater than the radius "R" of the balls 38, the difference being that appropriate to the desired pendulum frequency.

It should now be clear that the counterweight 24—26 is supported against centrifugal forces by the balls 38 and sockets 22—36 whereby the counterweight is free for pendulum movement both in the plane of Fig. 1 and in the plane of Fig. 2, that is to say, both rotationally and axially with respect to crankshaft. The counterweight, accordingly, comprises a damper effective against both torsional and "tuning-fork" or axial vibrations since the balls are free to roll in any direction on the sockets 22. At the same time, and regardless of the type of vibration encountered, the ball will have a rolling as distinct from a sliding co-action with the sockets whereby the chafing found in certain cases with the roller type damper will be eliminated. This universal mounting of the counterweight gives it freedom for a third mode of motion i. e., it may swing about the radial axis from the center of the weight to the crankshaft center corresponding to a twisting vibration of the extension arm 18 or of the crankcheek 12 as a whole. There is some evidence that the occasional scuffing of the cylindrical rollers heretofore used in this type of damper may be the result of this mode of vibration of the crankshaft, and accordingly, the provision of a counterweight which shall be also effective in this manner is one of the objects of this invention. The balls 38—38, with the coacting sockets, are symmetrically disposed on each side of the plane of symmetry of the crankshaft assembly. Accordingly, as the counterweight moves relative to the shaft, the two-point suspension of the counterweight gives rise to simple pendulum characteristics therein, whereby all points in the weight may move in an identical arcuate path, without polar movement of the weight relative to the shaft. This linear type of movement obtains for axial and rotational vibrations, which are predominant, but slight polar vibration may occur upon twisting deflections of the crank extension about a radius of the crank shaft or pin.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In combination, a crankshaft extension member, a counterweight member loosely embracing said crankshaft member, opposed spherical cups formed in the respective members, and balls rollably movable upon said cups upon relative rotational and longitudinal movement between said members.

2. A crankshaft having an extension provided with spherical ball seats facing towards the center of rotation of said shaft, a counterweight having spherical seats opposed to said crankshaft seats, balls rollably engaged between said seats for supporting said counterweight for pendulous action longitudinally and transversely of said shaft.

3. In combination, a crank shaft having an extension member and a counterweight, one loosely embracing the other, and having respectively opposed spherically curved ball race surfaces, balls rollably engaging said surfaces for universal pendulous support of said counterweight.

4. Means for suppressing torsional and axial vibrations of a crankshaft comprising a crankshaft extension member and a counterweight member, one loosely embracing the other, and a pendulous support for said weight comprising balls rollably engaging opposed spherically curved pockets formed in the respective members.

5. In combination, a shaft extension member having a concave spherically curved seat facing inwardly toward the shaft center, a counterweight member having a concave spherically curved seat opposed to said first seat, facing outwardly but lying inward of said first seat, and a ball between said seats and rollably engaged therewith.

6. In combination, a shaft extension member, a counterweight member, one embracing the other and having rotational and longitudinal clearance relative to each other, concave spherically curved seats on the respective members, the seat on the counterweight facing outwardly but lying inwardly of the seat on the extension, said seats being opposed, and a ball of lesser radius than either of said seats rollably contacted with both seats.

7. In combination, a shaft extension member having laterally spaced inwardly facing concave spherically curved seats, a counterweight having outwardly facing concave spherically curved seats opposed to said first seats, the centers of said counterweight seats and the center of gravity of the counterweight normally lying in a common plane normal to the shaft axis, and balls rollably contacting opposed extension and counterweight seats.

8. In combination, a shaft extension member and a counterweight member opposite thereto, a plurality of opposed concave spherically curved seats on the respectively opposite members, and balls rollably engaged between opposed seats.

9. In combination, a shaft extension member and a counterweight member opposite thereto, a plurality of opposed concave spherically curved seats on the respectively opposite members, balls rollably engaged between opposed seats and said members having relative longitudinal and rotational clearance, and said balls normally lying in a plane normal to the shaft axis and containing the counterweight center of gravity.

10. In combination, a shaft extension member and a counterweight member, one embracing the other with clearance to provide for relative longitudinal and rotational displacement, and a plurality of longitudinally and rotationally rollable connections between said members each comprising opposed spherically curved seats on respective members and a ball rollable on the seats, the ball having a radius smaller than the radii of the seats.

11. In combination with a shaft, an extension of the shaft having a concave spherically curved seat facing substantially inwardly toward the center of rotation, a weight having a concave spherically curved seat opposed to said first seat, and an element having spherically formed portions between and contacting respective seats.

ROLAND CHILTON.